Figure 1:
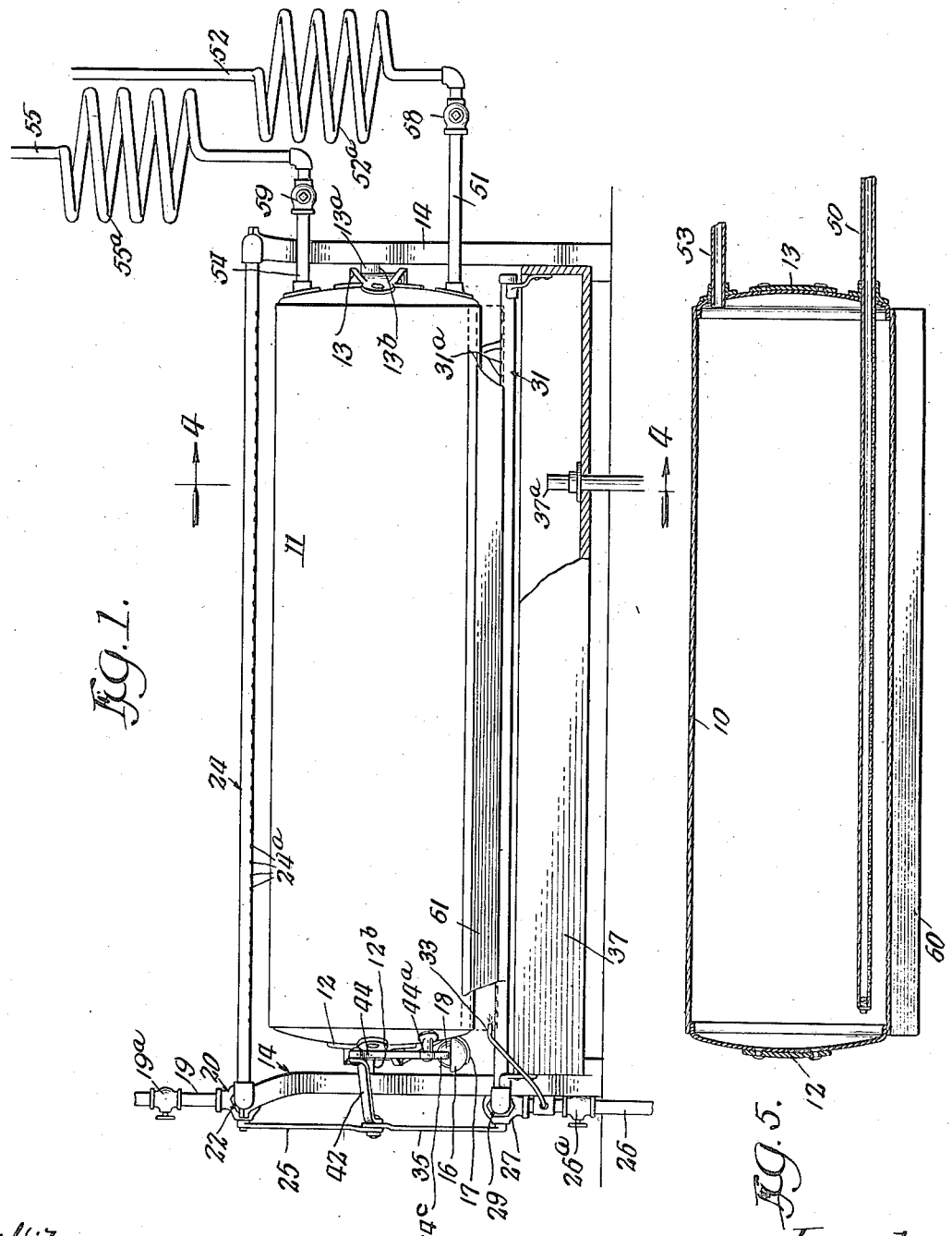

F. W. WOLF, Jr. & H. H. SOUTHWORTH.
REFRIGERATING APPARATUS.
APPLICATION FILED AUG. 22, 1910.

1,068,618.

Patented July 29, 1913.

3 SHEETS—SHEET 3.

Witnesses:

Inventors:
Fred W. Wolf Jr.
Harrison H. Southworth
by Poole & Brown Attys

UNITED STATES PATENT OFFICE.

FRED. W. WOLF, JR., AND HARRISON H. SOUTHWORTH, OF CHICAGO, ILLINOIS, ASSIGNORS TO ICELESS REFRIGERATOR COMPANY, OF CHICAGO, ILLINOIS, A CORPORATION OF ILLINOIS.

REFRIGERATING APPARATUS.

1,068,618.  Specification of Letters Patent.  Patented July 29, 1913.

Application filed August 22, 1910. Serial No. 578,329.

*To all whom it may concern:*

Be it known that we, FRED. W. WOLF, Jr., and HARRISON H. SOUTHWORTH, citizens of the United States, and residents of Chicago, in the county of Cook and State of Illinois, have invented certain new and useful Improvements in Refrigerating Apparatus; and we do hereby declare that the following is a full, clear, and exact description thereof, reference being had to the accompanying drawings, and to the letters of reference marked thereon, which form a part of this specification.

This invention relates to improvements in refrigerating apparatus and particularly to refrigerating apparatus of the absorption type. The invention is shown herein as applied to an apparatus of the alternating absorption type. A refrigerating apparatus of this kind in its most familiar form usually includes two drums, each constituting a generator absorber and each of which alternately contains weak liquor while the other contains strong liquor, the one containing weak liquor being subjected to the action of cooling water and receiving ammonia gas on its return from the refrigerating coils, while the other, containing strong liquor, is being subjected to the action of heat to drive off the ammonia gas which it has previously absorbed to condensing coils where the ammonia gas is condensed into liquid form and thence conveyed through an expansion valve beyond which it expands as a gas through the refrigerating coils and so back to the generator-absorber containing the weak liquor. After the capacity for absorption of the liquor in the weak liquor drum has been satisfied, the cooling water is diverted to the other drum which now contains weak liquor and the means for heating the latter drum, usually fuel gas, is diverted to the first drum which formerly contained the weak liquor and now contains the strong liquor, so that the second drum now absorbs ammonia gas, while the first drum gives off ammonia gas. The shifting of the cooling water from one drum to the other, and also the shifting of the gas in the reverse direction from one drum to the other, has heretofore required manual operation, and the object of the present invention is to provide an apparatus in which the shifting of the cooling water and of the gas supply is controlled automatically.

Our invention depends for its operation upon the fact that as the weak liquor in the one drum absorbs ammonia gas, the weight of said liquor increases in proportion to the amount of gas absorbed, while as the ammonia gas is driven off from the strong liquor in the other drum. In carrying out our invention we have applied this principle mechanically to the operation of certain devices by means of which the cooling water is diverted to one drum and the gas supply is diverted to the other drum to correspond to the change of location of the weak and strong liquor.

Figure 2:
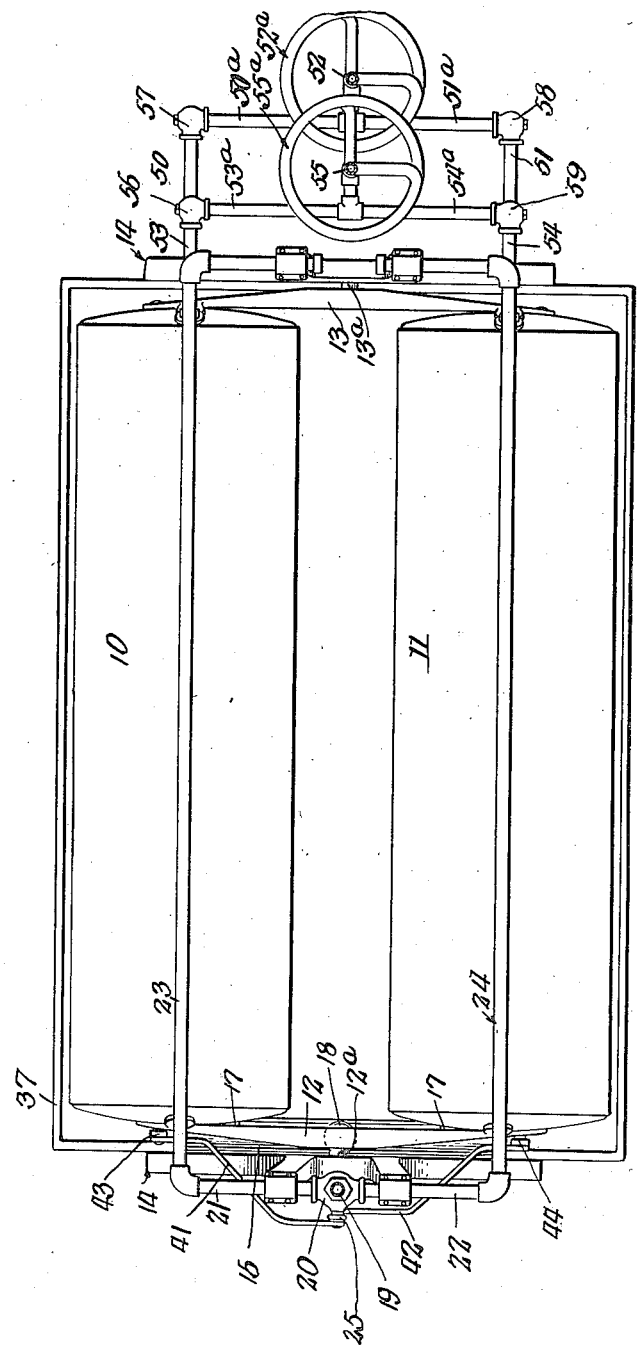
Figure 3:
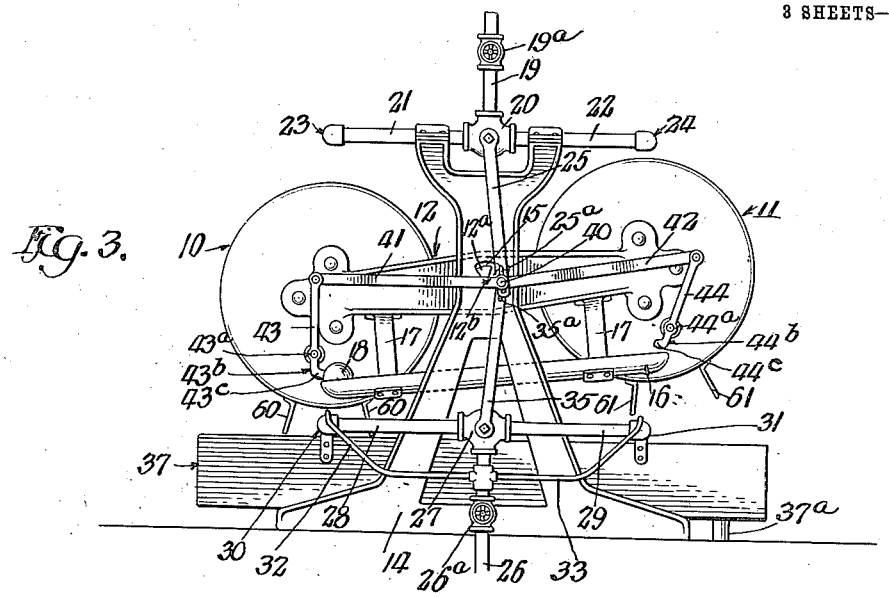
Figure 4:
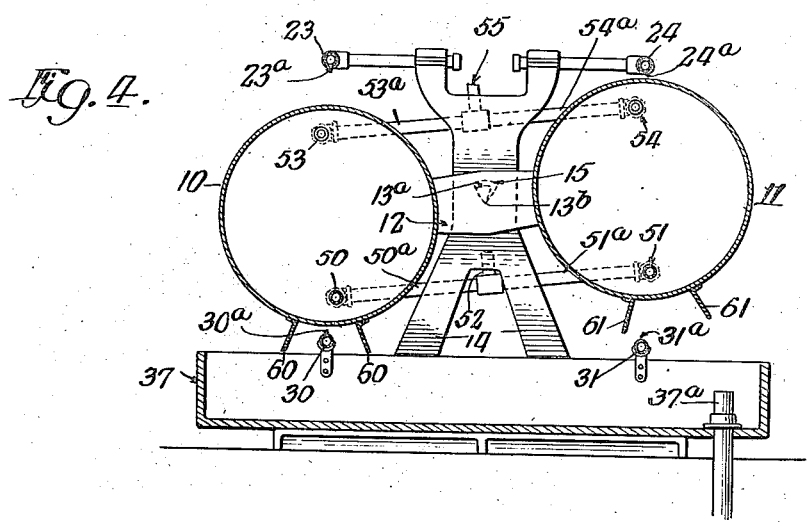

In the drawings:—Figure 1 is a side elevation of an apparatus embodying the features of our invention. Fig. 2 is a top plan view of the same. Fig. 3 is an end elevation of the apparatus. Fig. 4 is a vertical section through Fig. 1 on the line 4—4 thereof. Fig. 5 is a longitudinal vertical section through one of the drums.

In that embodiment of our invention illustrated in the drawings, 10 and 11 indicate drums each constituting a generator-absorber and being of any usual or convenient construction adapted for use in connection with a refrigerating apparatus. Said drums are rigidly connected at their ends by means of plates 12, 13, the drums and plates together constituting a rocking frame which is mounted in upright standards 14, 14.

$12^a$, $13^a$ indicate studs projecting respectively from the plates 12 and 13. Said studs are V-shaped, having knife edges $12^b$, $13^b$ at their lower edges which have bearing in V-shaped slots 15, 15 in the standards 14, 14. The angle of the V-shaped slots is greater than that of the V-shaped lugs so as to permit the frame to have a certain amplitude of oscillation, said oscillation being limited by the engagement of the sides of the V-shaped slots with the sides of the V-shaped studs.

16 is a trough-shaped runway parallel to the plane through the central axes of the drums 10 and 11 and rigidly connected to the oscillating frame of which said drums are a part. Said runway is secured by means of hangers 17, 17 to the rocking frame, said hangers being shown in the drawings as bolted to the plate 12. The runway forms a track for a ball 18 and is closed at its opposite ends to limit the movement of said ball.

19, is the main water supply pipe connected by a T-joint 20 to branch pipes 21, 22 which in turn connect with pipes 23 and 24 located vertically above the drums 10 and 11 and extending longitudinally of and parallel to said drums. The branch pipes 21, 22 are suitably supported in the front standard 14, while the rear ends of the pipes 23 and 24 are supported by the rear standard 14. Both of said pipes are provided with perforations 23$^a$, 24$^a$ on their underside through which water is adapted to be discharged on top of the associated drum.

25 is a lever which operates a two-way cock in the T-joint 20 and which is adapted to shift the water from the pipe 23 to the pipe 24 and then back again. The main water supply is controlled by a hand-valve 19$^a$.

26 is a main gas supply pipe connected by a T-joint 27 to branch pipes 28, 29, which are respectively connected with longitudinally extending pipes 30, 31 located under the drums 10 and 11, and extending longitudinally of and parallel to said drums. Said pipes are each provided with suitable burner openings 30$^a$, 31$^a$, which are adapted to be lighted from pilot lights 32, 33 fed from the main supply pipe 26.

26$^a$ is a hand-valve which controls the gas supply.

35 is a lever which operates a two-way cock located in the T-joint 27 adapted to shift the supply of gas from the pipe 30 to the pipe 31 and vice versa.

37 is a trough located below the drums to receive the cooling water after it has passed over the drums. The water is led from said trough by a pipe 37$^a$ to any suitable place for disposal. The gas pipes 30, 31, as shown in the drawings, are supported on said trough.

The levers 35, 25 are provided near their free ends with slots 35$^a$, 25$^a$ through which extend a pivot 40 to which are pivotally connected the ends of links 41, 42 which have their other ends pivotally connected to arms 43, 44 of rocking levers 43$^b$, 44$^b$. Said levers are pivotally mounted on the ends of the drums at 43$^a$, 44$^a$. The lower shorter arms 43$^c$, 44$^c$ of said levers are provided with angular extensions which are adapted to be struck by the ball 18 in the operation of the apparatus as will presently appear. Each drum is provided with lower intake pipes 50, 51, which are connected by branch pipes 50$^a$, 51$^a$ to a pipe 52 leading from the refrigerating coils; and with upper pipes 53, 54, connected by branch pipes 53$^a$, 54$^a$, to a pipe 55 which leads to the condensation coils. The pipes 55 and 52 include flexible coils 55$^a$, 52$^a$ which are inserted so that the connection of the tank with said pipe will not interfere with the operation of the rocking frame including the said tanks. Check valves are located at 56, 57, 58 and 59 which control the flow of gas to and from the tanks in the usual manner.

The tanks 10 and 11 are provided with deflecting vanes 60, 60 and 61, 61 which shed the cooling water and prevent it from putting out the lights.

The operation of the apparatus is as follows: Consider the parts of the apparatus in the position indicated in Figs. 3 and 4, when the drum 10 contains strong liquor and the drum 11 weak liquor, while the burners of the pipe 30 are burning under the tank 10 and cooling water is flowing from the pipe 24 over the drum 11. The ball 18 is on the side of the drum 10 and adds its weight to that of the drum 10 and the liquor contained in said drum to overbalance that side of the rocking frame. Under these conditions, ammonia gas is being driven from the drum 10 through the pipes 53, 53$^a$ and 55 to the cooling and condensing coils and at the same time ammonia gas which has passed through the refrigerating coils flows through the pipes 52, 51$^a$, 51 into the drum 11 wherein it is absorbed by the weak liquor. The check-valves referred to prevent the gas from entering the wrong drum in the ordinary manner. This operation continues, the drum 10, by reason of the loss of gas, gradually losing weight, while the drum 11, by reason of the absorption of gas, gradually increases in weight. Finally a point is reached when the drum 11 overweighs the combined weight of the drum 10 and of the ball 18, whereupon the rocking frame tilts toward the right and the ball 18 rolls down the runway 16 to the opposite end, the runway now being inclined in a direction opposite to that shown in the drawings. Just as the ball 18 reaches the end of its travel and at the very instant that it is traveling at its highest speed, it strikes the angular end of the short arm 44$^c$ of the lever 44$^a$, thereby shifting said lever and causing it through the link 42 to shift the levers 25 and 35 so as to reverse the cocks controlling the water and gas. This diverts the water from the pipe 24 to the pipe 23, above the drum 10, and diverts the supply of gas from the pipe 30 to the pipe 31 under the drum 11. Ammonia gas is now driven off from the drum 11 to the cooling and condensing coils while the ammonia gas from the refrigerating coils is taken into and absorbed by the liquor in the drum 10. This continues as before until the drum 10 overweights the combined weight of the drum 11 and the ball 18, when the frame is shifted back to the position indicated in the drawings with the ball and valves in the position as in the first instance.

The ball should be of sufficient weight to perform its one function of throwing the levers to operate the cocks and also to nearly equal the difference between the weight of the weak liquor tank when it has been substantially exhausted of ammonia gas and the weight of the strong liquor tank when it has absorbed the requisite amount of ammonia gas. The knife edge bearings for the fulcrums of the rocking frame are used so that the slightest movement of the frame will put it in unstable equilibrium whereupon the ball will roll toward the heavier drum and shift the frame in that direction.

The generator-absorber drums are opposed to each other in their vertical movement and each acts as a counterbalance for the other, while the ball 18 acts as an auxiliary counterbalance on the side of the drum which is in the lowest position of its movement.

It will be apparent that the operation of the apparatus is continuous and entirely automatic, requiring no attention whatever after it has once been started. The apparatus is of particular advantage for use in connection with small refrigerators where the employment of an attendant to give the requisite constant attention to the apparatus is not justified by economy.

While in illustrating our invention we have shown herein an apparatus showing one embodiment of the invention, it is apparent that the details of the apparatus may be modified in various ways without departing from the spirit of the invention and we do not wish to be in anyway limited thereby except in so far as pointed out in the appended claims.

We claim as our invention:—

1. In a refrigerating apparatus of the absorption type, a vertically movable generator-absorber adapted for containing liquor, a return pipe connected to said generator-absorber, a discharge pipe connected to said generator-absorber, flexible connections in said return and exhaust pipes, cooling and heating means adapted to alternately cool and heat said generator-absorber, a vertically movable counterbalancing member opposed to said generator-absorber, means connecting said generator-absorber with said counterbalancing member, and means actuated by the movement of one of said vertically movable devices acting to control said cooling and heating means.

2. In a refrigerating apparatus of the absorption type, a generator-absorber adapted for containing liquor, a return-pipe connected to said generator-absorber, a discharge pipe connected to said generator-absorber, flexible connections in said return and discharge pipes, cooling and heating means adapted to alternately cool and heat said generator-absorber, a rocking frame to which said generator-absorber is connected, a vertically movable counterbalancing member connected to said frame with its weight opposed to that of said generator-absorber, and means actuated by the movement of said rocking frame to control said cooling and heating means.

3. In a refrigerating apparatus of the alternating absorption type, vertically movable generator-absorbers adapted for containing liquor, return pipes connected to said generator-absorbers, discharge pipes connected to said generator-absorbers, flexible connections in said return and discharge pipes, cooling and heating means for cooling and heating said generator-absorbers in alternation, means connecting said generator-absorbers whereby the weight of one is opposed to the weight of the other, and means actuated by the movement of said generator-absorbers for controlling said cooling and heating means.

4. In a refrigerating apparatus of the alternating absorption type, generator-absorbers adapted for containing liquor, return pipes connected to said generator-absorbers, discharge pipes connected to said generator-absorbers, flexible connections in said return and discharge pipes, cooling and heating means adapted to cool and heat said generator-absorbers in alternation, a rocking frame to which said generator-absorbers are secured, with the weight of one generator-absorber opposed to that of the other generator-absorber, and means actuated by said rocking frame to control said cooling and heating means.

5. In a refrigerating apparatus of the alternating absorption type, generator-absorbers adapted for containing liquor, return pipes connected to said generator-absorbers, discharge pipes connected to said generator-absorbers, cooling and heating means for cooling and heating said generator-absorbers in alternation, a rocking frame to which said generator-absorbers are connected, with the weight of one generator-absorber opposed to that of the other generator-absorber, a track or runway rigidly secured to said rocking frame, a rolling auxiliary counterweight adapted to roll on said track or runway, and mechanism for controlling said cooling and heating means, said mechanism being actuated by said rolling counterweight.

6. In a refrigerating apparatus of the alternating absorption type, generator-absorbers adapted for containing liquor, return pipes connected to said generator-absorbers, discharge pipes connected to said generator-absorbers, cooling and heating means for cooling and heating said generator-absorbers in alternation, a rocking frame to which said generator-absorbers are connected with the weight of one generator-absorber opposed to that of the other generator absorber, a shifting auxiliary counterweight carried by said frame, and means actuated by said rocking frame for controlling said cooling and heating means.

7. In a refrigerating apparatus of the alternating absorption type, generator-absorbers adapted for containing liquor, return pipes connected to said generator-absorbers, discharge pipes connected to said generator-absorbers, cooling and heating means for cooling and heating said generator-absorbers in alternation, a rocking frame having limited oscillatory movement, said generator-absorbers being rigidly secured to said frame with the weight of one opposed to that of the other, a runway secured to and rocking with said frame, a rolling auxiliary counterweight having limited movement to each side of the rocking center of said frame, levers one for each generator-absorber located at the limits of the travel of said rolling counterweight, and means actuated by said levers for controlling said cooling and heating means.

8. In a refrigerating apparatus of the alternating absorption type, including generator-absorbers adapted for containing liquor, return pipes connected to said generator-absorbers, discharge pipes connected to said generator-absorbers, cooling water pipes located above each of said generator-absorbers, burner pipes located below each of said generator-absorbers, and controlling means for supplying cooling water to one generator-absorber and for turning on the gas supply under the other generator-absorber, a rocking frame to which said generator-absorbers are connected on opposite sides of the rocking center of said frame, a track or runway rigidly secured to said frame and rocking therewith, a rolling auxiliary counterweight adapted to roll on said track or runway and having limited movement on each side of the rocking center of said rocking frame, and levers located at opposite ends of said runway in position to be struck by said rolling counterweight, said levers actuating said water and gas controlling means.

In testimony, that we claim the foregoing as our invention we affix our signatures in the presence of two witnesses, this 15th day of August A. D. 1910.

FRED. W. WOLF, Jr.
HARRISON H. SOUTHWORTH.

Witnesses:
  G. R. WILKINS,
  T. H. ALFREDS